US012802210B2

(12) United States Patent
Salter et al.

(10) Patent No.: US 12,802,210 B2
(45) Date of Patent: Nov. 17, 2026

(54) VEHICLE CHARGER ELECTRIC COUPLER INSPECTION

(71) Applicant: Ford Global Technologies, LLC, Dearborn, MI (US)

(72) Inventors: Stuart Salter, White Lake, MI (US); Peter J. Nikolajevs, Dearborn, MI (US); Ryan O'Gorman, Beverly Hills, MI (US); Brendan Diamond, Naples, FL (US); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 18/775,684

(22) Filed: Jul. 17, 2024

(65) Prior Publication Data

US 2026/0024190 A1 Jan. 22, 2026

(51) Int. Cl.

| | |
|---|---|
| ***G06T 7/00*** | (2017.01) |
| ***B60L 53/16*** | (2019.01) |
| ***B60L 53/68*** | (2019.01) |

(52) U.S. Cl.

CPC .............. *G06T 7/001* (2013.01); *B60L 53/16* (2019.02); *B60L 53/68* (2019.02); *G06T 2207/10024* (2013.01); *G06T 2207/10048* (2013.01); *G06T 2207/30252* (2013.01)

(58) Field of Classification Search

CPC ........... G06T 7/001; G06T 2207/10024; G06T 2207/10048; G06T 2207/30252; B60L 53/16; B60L 53/68

See application file for complete search history.

(56) References Cited

U.S. PATENT DOCUMENTS

| | | | | |
|---|---|---|---|---|
| 11,515,586 | B2 | 11/2022 | Guerra et al. | |
| 11,616,259 | B1 | 3/2023 | Dhawan et al. | |
| 11,781,939 | B2 | 10/2023 | Yesh et al. | |
| 2019/0063864 | A1 | 2/2019 | Stewart et al. | |
| 2019/0315240 | A1 | 10/2019 | Wu | |
| 2021/0067616 | A1 | 3/2021 | Penfold | |
| 2021/0199479 | A1* | 7/2021 | Lau | G01S 13/931 |
| 2021/0325888 | A1* | 10/2021 | Mandel-Senft | B60K 35/28 |
| 2021/0341250 | A1 | 11/2021 | Stewart et al. | |
| 2024/0010086 | A1 | 1/2024 | Osei-Kusi | |
| 2024/0149739 | A1* | 5/2024 | Burns | B60L 53/16 |

FOREIGN PATENT DOCUMENTS

| | | | |
|---|---|---|---|
| CN | 116061734 | A | 5/2023 |
| DE | 102017215724 | A1 | 3/2019 |
| DE | 102019100703 | A1 | 7/2019 |
| JP | 2021009507 | A | 1/2021 |
| WO | 9936297 | A1 | 7/1999 |
| WO | 2024018448 | A2 | 1/2024 |

* cited by examiner

*Primary Examiner* — Michael C Zarroli

(74) *Attorney, Agent, or Firm* — McCoy Russell LLP

(57) ABSTRACT

A system and a method for diagnosing operation of a vehicle charger electric coupler is disclosed. The vehicle charger electric coupler allows electric current to flow from a vehicle charger to a vehicle. The diagnostic system and method may include capturing an image of the vehicle charger electric coupler to determine whether or not the vehicle charger electric coupler is degraded.

20 Claims, 5 Drawing Sheets

VEHICLE CHARGER ELECTRIC COUPLER INSPECTION

FIELD

The present description relates generally to inspecting and repairing a vehicle charger electric coupler for a vehicle charger.

BACKGROUND/SUMMARY

A vehicle charger may supply electric charge to an electric vehicle. The vehicle charger may supply alternating current (AC) and/or direct current (DC) via a vehicle charger electric coupler. The vehicle charger may be deployed inside of a garage or outside. Consequently, the charger and the vehicle charger electric coupler may be subject to environmental conditions including but not limited to rain, snow, ice, sunshine, and variations of ambient temperature. Over time these conditions may affect the vehicle charger electric coupler such that it may be less efficient to charge a vehicle via the vehicle charger.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
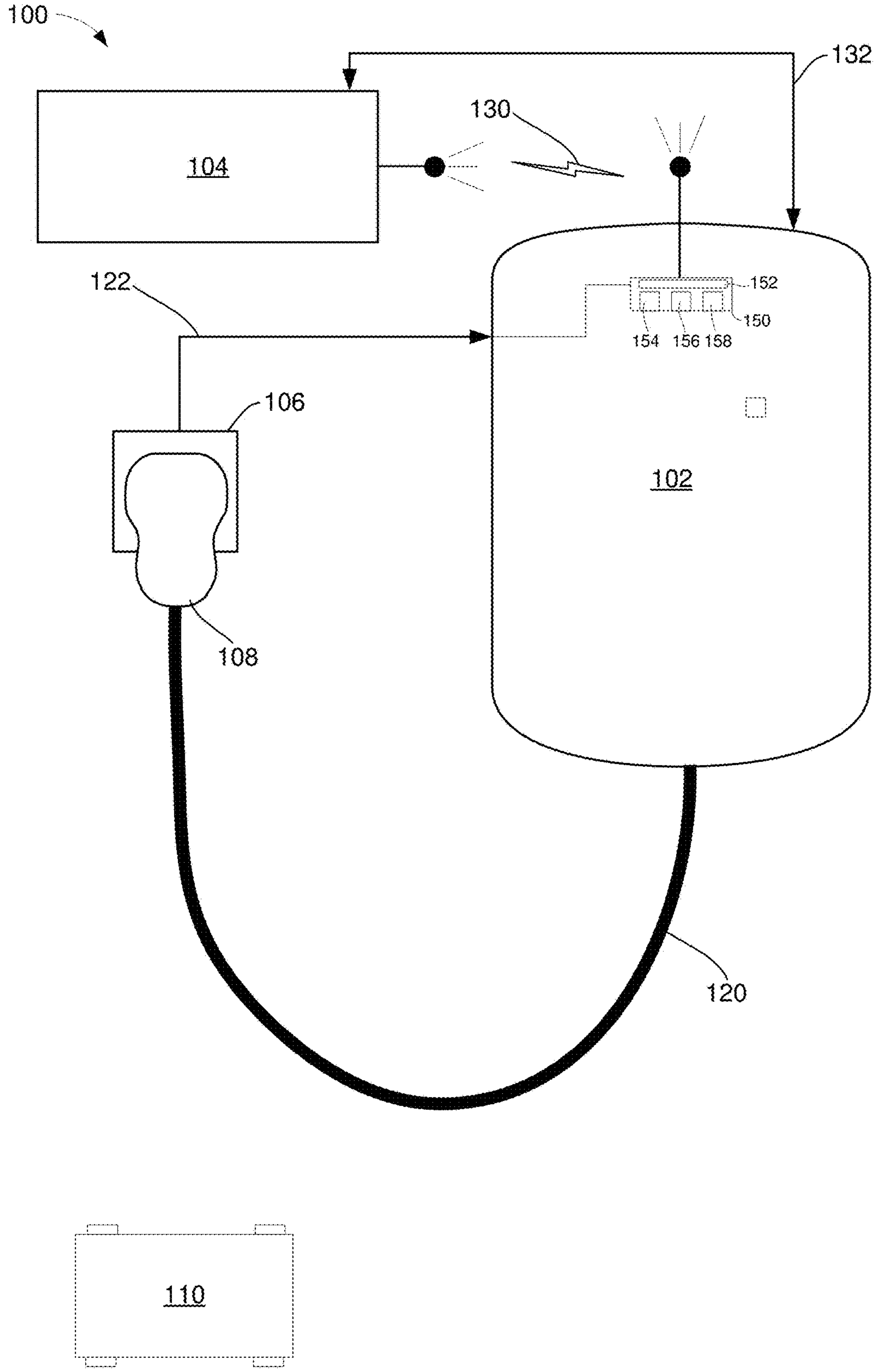
FIG. 1 is a schematic diagram of an example vehicle charger.
Figure 2:
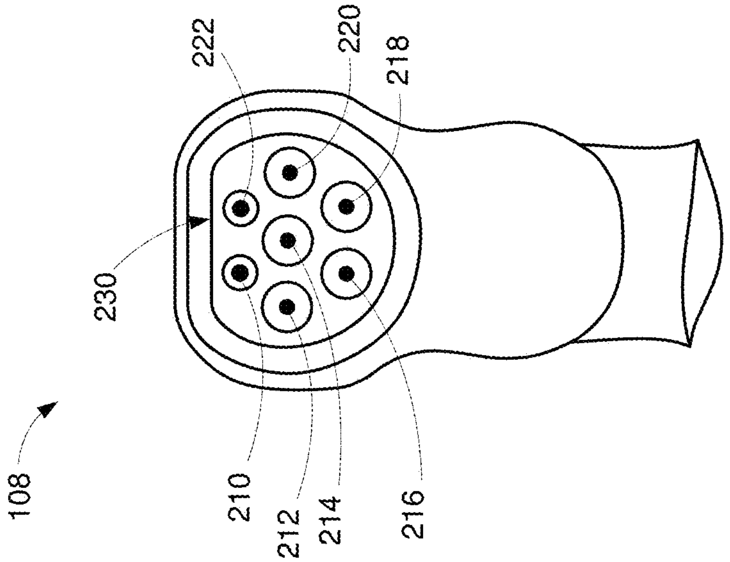
FIG. 2 is a sketch of an example vehicle charger electric coupler.
Figure 3:
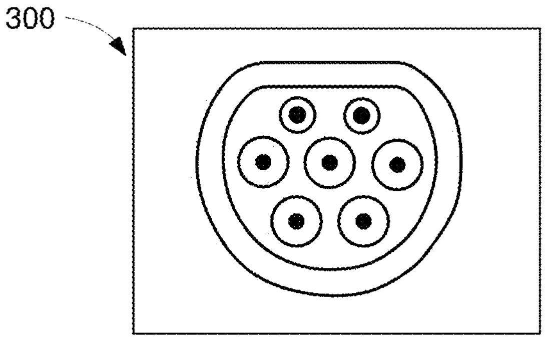
FIG. 3-5 show example images of the vehicle charger electric coupler and its contacts.
Figure 4:
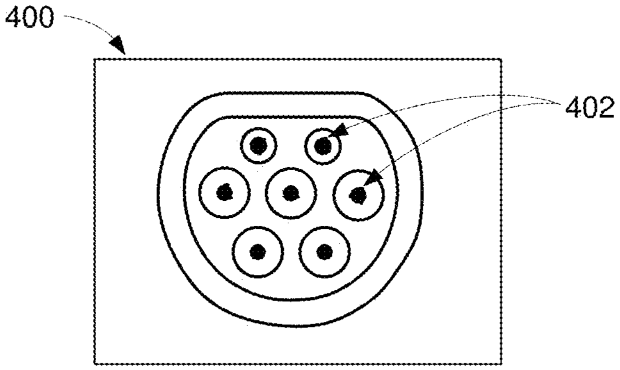
Figure 5:
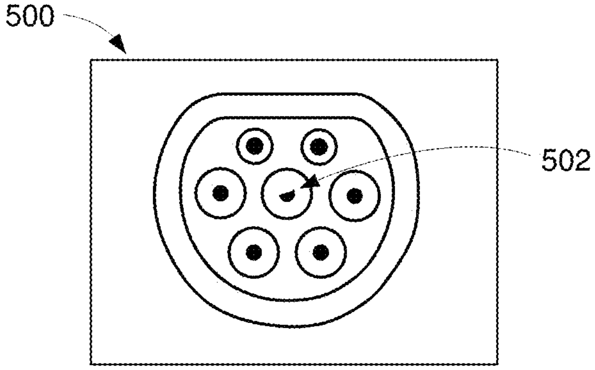
Figure 6:
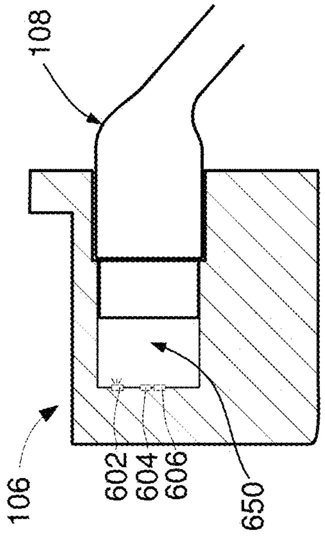
FIG. 6 shows a sketch of a cut-away view of a vehicle charger electric coupler holster and vehicle charger electric coupler.
Figure 7:
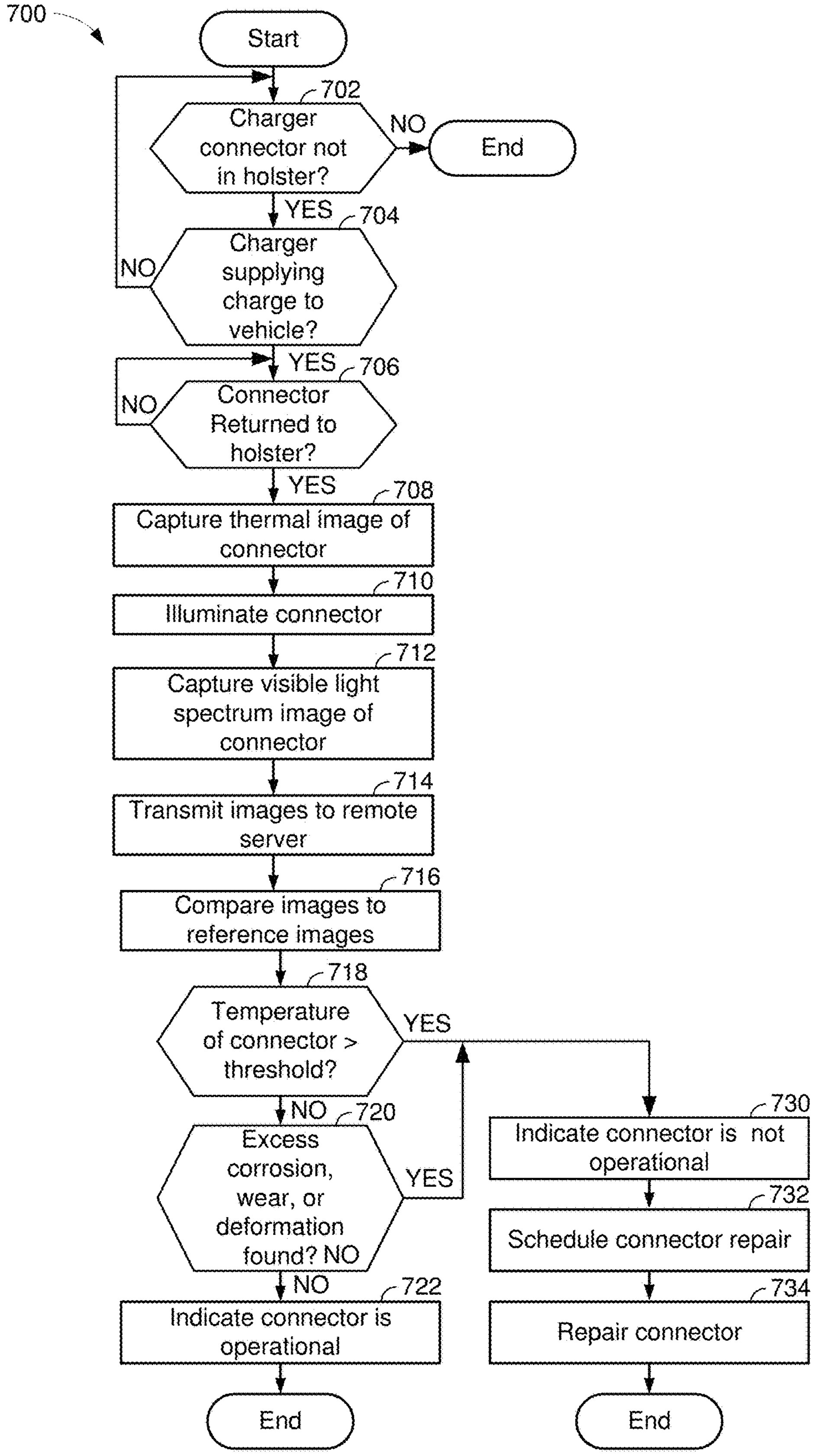
FIG. 7 shows a flowchart of a method to inspect and repair a vehicle charger electric coupler.

The following description relates to systems and methods for inspecting and repairing a vehicle charger electric coupler of a vehicle charger. The vehicle charger may be configured to supply AC and/or DC power to an electric or partial electric hybrid vehicle. An example vehicle charger and vehicle charger electric coupler are shown in FIG. 1. A view of contacts of the vehicle charger electric coupler is shown in FIG. 2. The vehicle charger electric coupler allows charging equipment to interface with a vehicle so that the vehicle's traction battery may be charged. The vehicle charger electric coupler may carry electric current from the vehicle charger to the vehicle. Example images of the vehicle charger electric coupler are shown in FIGS. 3-5. A cut-away view of a holster for a vehicle charger electric coupler is shown in FIG. 6. A method for inspecting and repairing a vehicle charger electric coupler is shown in FIG. 7.

A vehicle charger electric coupler may electrically couple an electric vehicle charger to an electric vehicle. Over time, the vehicle charger electric coupler's contacts may corrode and corrosion on the contacts may lead to less efficient vehicle charging and heating of the electric coupler due to an increase in resistance of the vehicle charger electric coupler's electrical contacts. Further, the vehicle charger electric coupler may be subject to improper handing by a vehicle charger user resulting in charger electric coupler degradation. If the vehicle charger were to continue to operate, it may lead to degradation of the charger and/or the vehicle charger electric coupler. On the other hand, if the vehicle charger electric coupler constrains use of the charger, the charger may not be able to perform its function.

The inventors herein have recognized the above-mentioned issues and have developed a method for a vehicle charger, comprising: capturing an image of a vehicle charger electric coupler; comparing the image to one or more images; and scheduling servicing of the vehicle charger electric coupler via sending a message in response to the comparing.

By capturing an image of a vehicle charger connector and comparing the image to one or more images, it may be possible to determine and/or predict degradation of a vehicle charger electric coupler be compared to one or more other different images to determine whether or not the vehicle charger electric coupler is corroded, being heated, and/or otherwise degraded. Based on the comparison a human or machine may repair or replace the vehicle charger electric coupler.

The present description may provide several advantages. In particular, the approach may be applied to predict vehicle charger electric coupler degradation. In addition, the approach may sense vehicle charger degradation. Further, the approach may reduce vehicle charger service call financial expenses and increase operational time for a vehicle charger.

FIG. 1 illustrates an example vehicle charging system 100. Vehicle charging system includes a vehicle charger electric coupler 108 for electrically coupling vehicle charger 102 to electric or hybrid vehicle 110. The vehicle charger electric coupler 108 allows electric current to flow from a vehicle charger to a vehicle. Vehicle charger electric coupler 108 may be held via holster 106 when vehicle charger 102 is not in use. Electric power may be delivered from vehicle charger 102 to vehicle charger electric coupler 108 via power cord 120. Images may be transferred from holster 106 to vehicle charger 102 via link 122 (e.g., electric cable or fiber optic cable) or via radio frequency. Vehicle charger 102 may transmit images of vehicle charger electric coupler 108, diagnostic information, operating statistics, etc. to remote server 104 (e.g., an electronic controller) via radio frequency transmission 130 or via an internet connection 132.

Vehicle charger 102 includes a controller 150 with inputs and outputs 152 (e.g., digital inputs, digital outputs, analog inputs, analog outputs, controller area network, etc.). Controller 150 also includes a processor or processing unit 154, read exclusive memory 156 (e.g., non-transitory memory), and random-access memory 158.

Referring now to FIG. 2, a front view of vehicle charger electric coupler 108 is shown. In this example, vehicle charger electric coupler 108 is a SAE J3068 electric coupler, but it is appreciated that other vehicle charger electric couples are anticipated. Vehicle charger electric coupler 108 includes an AC phase 1 contact 212 or terminal (e.g., pin/socket), AC phase 2 contact 216, AC phase 3 contact 218, and AC neutral contact 220 for three phase AC power. Vehicle charger electric coupler 108 also includes a protective earth contact 214, a control pilot contact 210, and a proximity pilot contact 222. Thus, vehicle charger electric coupler 108 is configured to transfer three phase 480 volt AC power between charger 102 and a vehicle.

The system of FIGS. 1 and 2 provides for a vehicle charger, comprising: a vehicle charger electric coupler; a vehicle charger electric coupler holster including a light source and a light sensor; and a controller including executable instructions stored in non-transitory memory that cause the controller to capture an image of the vehicle charger electric coupler via the light sensor. In a first example, the vehicle charger includes where the light sensor senses infrared light. In a second example that may include the first example, the vehicle charger includes where the light sensor senses red, green, and blue light. In a third example that may include one or both of the first and second examples, the vehicle charger further comprises additional instructions that cause the controller to transmit the image to a remote device. In a fourth example that may include one or more of the first through third examples, the vehicle charger further comprises additional instructions that cause the controller to capture the image in response to the vehicle charger electric coupler being installed in the vehicle charger electric coupler holster. In a fifth example that may include one or more of the first through fourth examples, the vehicle charger further comprises additional instructions that cause the controller to compare the image to one or more other images. In a sixth example that may include one or more of the first through fifth examples, the vehicle charger further comprises additional instructions that cause the controller to request service in response to comparing the image to the one or more other images.

Referring now to FIGS. 3-5, example images from a camera of a front side of a vehicle charger electric coupler are shown. FIG. 3 shows the vehicle charger electric coupler in its expected operating condition. In image 300, neither the contacts nor the housing of the electric coupler are degraded. Conversely, FIG. 4 is an image 400 of a similar vehicle charger electric coupler, but in this figure corrosion 402 of contacts is shown. FIG. 5 is an image 500 of a similar vehicle charger electric coupler, but in this example an altered contactor 502 is shown. These images are merely a small portion of images that an image of vehicle charger electric coupler 108 may be compared to as a basis for determining degradation of vehicle charger electric coupler 108.

Turning now to FIG. 6, a cut away view of a vehicle charger electric coupler holster and a vehicle charger electric coupler is shown. Vehicle charger electric coupler holster 106 includes a light source 602 (e.g., a light emitting diode or other light source), an infrared sensor or camera 604 and a red, green, and blue (RGB) light sensor or camera 606 for sensing visible light that are positioned within cavity 650. Infrared sensor or camera 604 may sense infrared light and capture images of objects. Temperatures of the objects may be determined from the images that have been captured via the infrared camera. Infrared sensor or camera 604 and RGB light sensor or camera 606 are positioned to capture the images as shown in FIGS. 3-5. Thus, infrared sensor or camera 604 and RGB light sensor or camera 606 are pointed toward the front of vehicle charger electric coupler 108 so that they may capture images of the front of vehicle charger electric coupler 108 as shown in FIG. 2. Cavity 650 also accepts vehicle charger electric coupler 108 when vehicle charger electric coupler 108 is not in use.

Referring now to FIG. 7, a flow chart of an example method for inspecting and repairing a vehicle charger electric coupler is shown. The method of FIG. 7 may be incorporated into and may cooperate with the systems of FIGS. 1 and 2. Further, at least portions of the method of FIG. 7 may be incorporated as executable instructions stored in non-transitory memory of one or more controllers. The one or more controllers may change an operating state of a device in the real world. Additionally, portions of the method of FIG. 7 may be performed via a human in the real world to change an operating state of a device.

At 702, method 700 judges whether or not the vehicle charger electric coupler is not in the vehicle charger electric coupler holster (e.g., a device that holds the electric coupler when the electric coupler is not being used to charge a vehicle). In one example, method 700 may judge that the vehicle charger electric coupler is not installed in the vehicle charger electric coupler according to output of one or more cameras or light sensors. Alternatively, the absence of the vehicle charger electric coupler may cause a switch to open or close to indicate that the vehicle charger electric coupler is not installed in the holster. If method 700 judges that the vehicle charger electric coupler is not installed in the vehicle charger electric coupler holster, the answer is yes and method 700 proceeds to 704. Otherwise, the answer is no and method 700 proceeds to exit.

At 704, method 700 judges whether or not the vehicle charger is supplying charge to a vehicle. In one example, method 700 may determine if current is flowing from the charger to make this determination. If method 700 judges that the vehicle charger is supplying charge to the vehicle, the answer is yes and method 700 proceeds to 706. Otherwise, the answer is no and method 700 returns to 702.

At 706, method 700 judges whether or not the vehicle charger electric coupler has been returned to the vehicle charger electric coupler holster. In one example, method 700 may judge that the vehicle charger electric coupler is installed in the vehicle charger electric coupler according to output of one or more cameras or light sensors. Alternatively, the vehicle charger electric coupler being installed in the holster may cause a switch to open or close to indicate that the vehicle charger electric coupler is installed in the holster. If method 700 judges that the vehicle charger electric coupler is installed in the vehicle charger electric coupler holster, the answer is yes and method 700 proceeds to 708. Otherwise, the answer is no and method 700 stays at 706.

At 708, method 700 captures a thermal image of the front of the vehicle charger electric coupler similar to those shown in FIGS. 3-5. The thermal image may be captured via an infrared camera or sensor. The thermal image is stored as radiation data values for each sensor pixel to memory (e.g., random-access memory) of a controller and the data for each sensor pixel may be converted to numeric value that represents a color for each pixel in the image that is generated from the thermal image so that a color image may be stored to controller memory from the radiation data. The image pixel colors may be indicative of the temperature that was sensed by the infrared camera or sensor. This color image allows the controller to estimate temperatures of the vehicle charger electric coupler and its components (e.g., housing temperature, contact temperature, etc.). Method 700 proceeds to 710.

At 710, method 700 illuminates the vehicle charger electric coupler. The vehicle charger electric coupler may be illuminated via a light source (e.g., 602 of FIG. 6). Method 700 proceeds to 712.

At 712, method 700 captures a RGB image of the front of the vehicle charger electric coupler via a RGB sensor. The RGB image is stored as data to memory of a controller. This image allows the controller to determine the presence or absence of corrosion, wear, and degraded contacts. Method 700 proceeds to 714.

At 714, method 700 transmits one or more images to a remote server. The images may be transmitted via a wireless network (e.g., cellular network, satellite, etc.) or wired network (e.g., internet). Method 700 proceeds to 716.

At 716, method 700 compares one or more images of the front of the vehicle charger electric coupler to one or more images of vehicle charger electric coupler. The one or more images may be referred to as reference images from which the recently captured image may be compared. The comparison may include determining changes in size (e.g., dimensions) and/or color and/or deformation between elements (e.g., components of the vehicle charger electric coupler) in the reference images and elements in the most recently captured image. Further, method 700 may determine temperatures of the vehicle charger electric coupler and its components based on colors of a thermal image that was taken via the vehicle charger electric coupler. For example, a particular shade of red for a pixel may indicate a temperature of 25 degrees Celsius.

The reference images may be selected and applied based on machine learning algorithms that compile data from other vehicles using vehicle to vehicle and vehicle to infrastructure networks. The machine learning may also determine maximum temperatures for vehicle charger electric coupler components. Method 700 proceeds to 718.

At 718, method 700 judges whether one or more temperatures of the vehicle charger electric coupler are greater than their respective temperature thresholds. If so, the answer is yes and method 700 proceeds to 730. Otherwise, the answer is no and method 700 proceeds to 720.

At 720, method 700 judges if the comparison between the image of the vehicle charger electric coupler and the one or more reference images indicates corrosion, deformation, or other forms of degradation. If so, the answer is yes and method 700 proceeds to 730. Otherwise, the answer is no and method 700 proceeds to 722.

At 718, method judges whether one or more temperatures of the vehicle charger electric coupler are greater than their respective temperature thresholds. If so, the answer is yes and method 700 proceeds to 730. Otherwise, the answer is no and method 700 proceeds to 720.

At 722, method 700 indicates that the vehicle charger electric coupler is operational. The indication may be via a display, data record, or other means. Method 700 proceeds to exit.

At 730, method 700 indicates that the vehicle charger electric coupler is not operational at full capacity. The indication may be via a display, data record, or other means. Method 700 proceeds to 732.

At 732, method 700 schedules service for the vehicle charger electric coupler. The scheduling may include sending a message to a repairman or robot via a network. For example, a repairman may receive scheduling information via text message, electronic mail, internet posting, pager text, a human/machine interface, or other known messaging media. The scheduling information may include charger identification, location, and service to be performed. Further, the controller may indicate why the service is being requested (e.g., degraded connector, arching, corrosion, etc.). In some examples, method 700 may de-rate the vehicle charger such that the power output that is available from the charger to charge vehicles is reduced from a maximum level in response to the heating and/or degradation of the vehicle charger electric coupler. For example, if the charger has a maximum rated output of 11.5 kilowatts, charger output may be constrained to 5 kilowatts. Method 700 proceeds to 734.

At 734, method 700 services the vehicle charger electric coupler. The service may include, but is not limited to a human replacing the coupler, replacing contacts within the coupler, cleaning the coupler, etc. Alternatively, a robot may be commissioned to perform the servicing. Method 700 proceeds to exit.

In this way, one or more cameras or light sensors may capture images of a vehicle charger electric coupler. The images may be transmitted to a remote device such as a server or other computer for assessing degradation of a vehicle charger electric coupler. The server may schedule service for the vehicle charger electric coupler based on comparing images of the vehicle charger electric coupler to other images.

Thus, the method of FIG. 7 provides for a method for diagnosing a vehicle charger, comprising: capturing an image of a vehicle charger electric coupler; comparing the image to one or more images; and scheduling servicing of the vehicle charger electric coupler via sending a message in response to the comparison. In a first example, the method includes where the image is captured via a camera. In a second example that may include the first example, the method includes where the camera is positioned within a holster for the camera. In a third example that may include one or both of the first and second examples, the method includes where the camera senses infrared light. In a fourth example that may include one or more of the first through third examples, the method includes where the camera senses red, green, and blue light. In a fifth example that may include one or more of the first through fourth examples, the method further comprises servicing the vehicle charger electric coupler. In a sixth example that may include one or more of the first through fifth examples, the method includes where servicing the vehicle charger electric coupler includes replacing one or more contacts of the vehicle charger electric coupler or replacing the vehicle charger electric coupler. In a seventh example that may include one or more of the first through eighth examples, the method further comprises transmitting the image to a remote server.

The method of FIG. 7 also provides for a method for diagnosing a vehicle charger, comprising: capturing an image of a vehicle charger electric coupler; estimating a temperature of at least a portion of the vehicle charger electric coupler via the image; and scheduling servicing of the vehicle charger electric coupler via sending a message in response to the temperature. In a first example, the method includes where the image is captured via an infrared light sensor. In a second example that may include the first example, the method includes where the message is sent to a remote server. In a third example that may include one or both of the first and second examples, the method further comprises capturing the image in response to a vehicle charger electric coupler being installed in a vehicle charger electric coupler holster. In a fourth example that may include one or more of the first through third examples, the method includes where the vehicle charger electric coupler is installed in the vehicle charger electric coupler holster after the vehicle charger supplied charge to a vehicle Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other vehicle hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for diagnosing a vehicle charger, comprising:
capturing an image of a vehicle charger electric coupler;
comparing the image to one or more images;
de-rating, in response to the comparing, the vehicle charger such that power output that is available from the vehicle charger to charge vehicles is reduced from a maximum level; and
scheduling servicing of the vehicle charger electric coupler via sending a message in response to the comparing.

2. The method of claim 1, where the image is captured via a sensor.

3. The method of claim 2, where the sensor is positioned within a holster for the vehicle charger electric coupler.

4. The method of claim 2, where the sensor senses infrared light.

5. The method of claim 2, where the sensor senses red, green, and blue light.

6. The method of claim 1, further comprising servicing the vehicle charger electric coupler.

7. The method of claim 6, where servicing the vehicle charger electric coupler includes replacing one or more contacts of the vehicle charger electric coupler or replacing the vehicle charger electric coupler.

8. The method of claim 1, further comprising transmitting the image to a remote server.

9. A vehicle charger, comprising:
a vehicle charger electric coupler;
a vehicle charger electric coupler holster including a light source and a light sensor; and
a controller including executable instructions stored in non-transitory memory that cause the controller to capture an image of the vehicle charger electric coupler via the light sensor and de-rate the vehicle charger such that power output that is available from the vehicle charger to charge vehicles is reduced from a maximum level, if an analysis of the image indicates that the vehicle charger electric coupler is not operational at full capacity.

10. The vehicle charger of claim 9, where the light sensor senses infrared light.

11. The vehicle charger of claim 9, where the light sensor senses red, green, and blue light.

12. The vehicle charger of claim 9, further comprising additional instructions that cause the controller to transmit the image to a remote device.

13. The vehicle charger of claim 9, further comprising additional instructions that cause the controller to capture the image in response to the vehicle charger electric coupler being installed in the vehicle charger electric coupler holster.

14. The vehicle charger of claim 9, further comprising additional instructions that cause the controller to compare the image to one or more other images.

15. The vehicle charger of claim 14, further comprising additional instructions that cause the controller to request service in response to comparing the image to the one or more other images.

16. A method for diagnosing a vehicle charger, comprising:
capturing an infrared image of a vehicle charger electric coupler;
generating a colorized thermal image from the infrared image, the colorized thermal image including a respective color value at each pixel that is indicative of a temperature that was sensed via the infrared image;
estimating a temperature of at least a portion of the vehicle charger electric coupler via the colorized thermal image; and
scheduling servicing of the vehicle charger electric coupler via sending a message in response to the temperature.

17. The method of claim 16, where the infrared image is captured via an infrared light sensor.

18. The method of claim 16, where the message is sent to a remote server.

19. The method of claim 16, further comprising capturing the infrared image in response to the vehicle charger electric coupler being installed in a vehicle charger electric coupler holster.

20. The method of claim 19, where the vehicle charger electric coupler is installed in the vehicle charger electric coupler holster after the vehicle charger supplied charge to a vehicle.

* * * * *